Oct. 17, 1967 M. T. FARQUHAR 3,346,939
APPARATUS FOR PLACING SEPARATOR CELLS AROUND BOTTLES AND
THE LIKE AND FOR PACKAGING SUCH BOTTLES
Filed Feb. 14, 1963 7 Sheets-Sheet 1

INVENTOR.
MELVILLE T. FARQUHAR

BY

HIS ATTORNEYS

Oct. 17, 1967  M. T. FARQUHAR  3,346,939
APPARATUS FOR PLACING SEPARATOR CELLS AROUND BOTTLES AND
THE LIKE AND FOR PACKAGING SUCH BOTTLES
Filed Feb. 14, 1963  7 Sheets-Sheet 2

INVENTOR.
MELVILLE T. FARQUHAR
BY
HIS ATTORNEYS

Oct. 17, 1967  M. T. FARQUHAR  3,346,939
APPARATUS FOR PLACING SEPARATOR CELLS AROUND BOTTLES AND
THE LIKE AND FOR PACKAGING SUCH BOTTLES
Filed Feb. 14, 1963  7 Sheets-Sheet 4

INVENTOR.
MELVILLE T. FARQUHAR
BY Glenn, Palmer
& Matthews
HIS ATTORNEYS

United States Patent Office 3,346,939
Patented Oct. 17, 1967

3,346,939
APPARATUS FOR PLACING SEPARATOR CELLS AROUND BOTTLES AND THE LIKE AND FOR PACKAGING SUCH BOTTLES
Melville T. Farquhar, Bon Air, Va., assignor to Reynolds Metals Company, Richmond, Va., a corporation of Delaware
Filed Feb. 14, 1963, Ser. No. 258,578
15 Claims. (Cl. 29—208)

This invention relates to an improved apparatus and method for placing a separator annulus cell around a fragile object, such as a beverage bottle or the like, in order to enable the object to be packaged together with like objects in a carton or the like so that each object will be separated from adjacent objects by the separator cells.

While such separator cells per se and in combination with fragile objects do not form part of this invention, no apparatus or method has been heretofore provided for automatically and efficiently applying such separator cells around the fragile objects.

Further no means have heretofore been provided for automatically placing such objects in a carton or the like after the same have had the separator cells placed therearound in the desired pattern.

Accordingly, it is an object of this invention to provide an apparatus for placing such separator cells around objects or the like, the apparatus of this invention having one or more of the novel features set forth above or hereinafter shown or described.

Another object of this invention is to provide a method for placing such separator cells around objects or the like, the method of this invention having one or more of the novel features set forth above or hereinafter shown or described.

A further object of this invention is to provide an apparatus for placing such objects in a carton or the like.

Another object of this invention is to provide a method for placing such objects in a carton or the like.

Other objects, uses and advantages of this invention are apparent from a reading of this description, which proceeds with reference to the accompanying drawings forming a part thereof and wherein:

FIGURES 14–22 are respectively schematic views illustrating the apparatus of this invention for placing a plurality of objects in a carton or the like.

While the various features of this invention are hereinafter described and illustrated as being particularly adaptable for placing a separator cell around a fragile object, such as a beverage bottle or the like, it is to be understood that the various features of this invention can be utilized singly or in any combination thereof to provide means for placing any desired members around any desired objects.

Therefore, this invention is not to be limited to only the embodiment illustrated in the drawings, because the drawings are merely utilized to illustrate one of a wide variety of uses of this invention.

Figure 1:
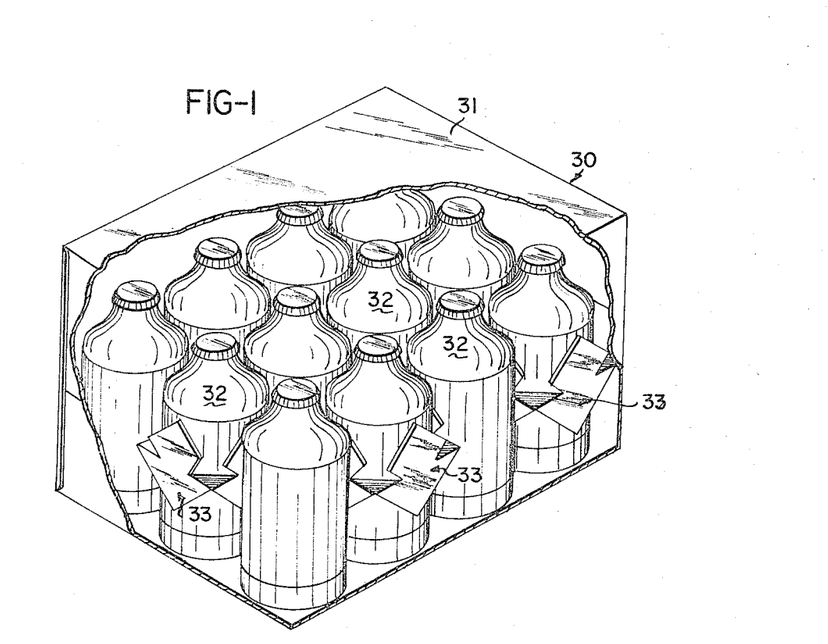
FIGURE 1 is a broken away, perspective view illustrating an improved package construction formed by the teachings of this invention.

Referring now to FIGURE 1, a package construction formed in accordance with the teachings of this invention is generally indicated by the reference numeral 30 and comprises a paper board carton 31 or the like containing a plurality of fragile objects 32, such as beverage bottles or the like, arranged in aligned rows with certain of the objects 32 having a separator annulus cell 33 disposed around the same.

Figure 2:
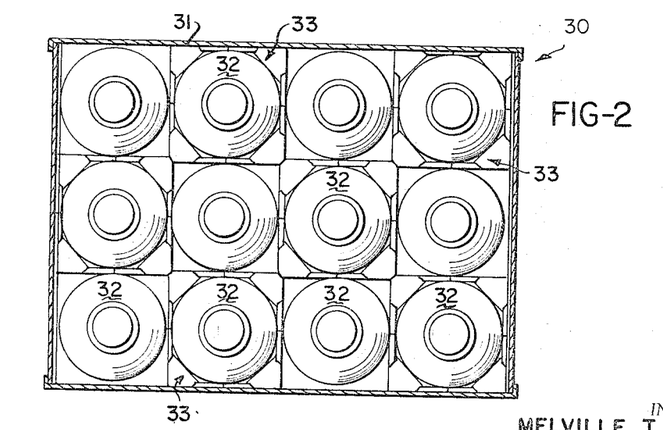
FIGURE 2 is a top cross-sectional view of the package construction illustrated in FIGURE 1.

For example, reference is made to FIGURE 2 wherein it can be seen that every other object 32 in each row thereof has a separator annulus cell 33 disposed around the same and in staggered relation relative to separator cells 33 around the objects 32 in the rows adjacent thereto.

In this manner, it can be seen that each packaged fragile object 32 does not engage an adjacent fragile object 32 as the same are separated by the cells 33, the cells 33 being formed of cardboard or the like to provide a cushioning means between adjacent objects 32.

Thus, the carton 31 can be rather roughly handled during shipment and storage thereof without having the objects 32 banging against each other and thereby being damaged as would be the case if the separator cells 33 were not utilized.

As previously set forth, the package construction 30 and separator cells 33 per se do not form part of this invention, whereas this invention provides an apparatus and method for forming such a package construction or the like.

However, sufficient details of the separator cells 33 will now be described in order to better understand the features of the instant invention.

Figure 3:
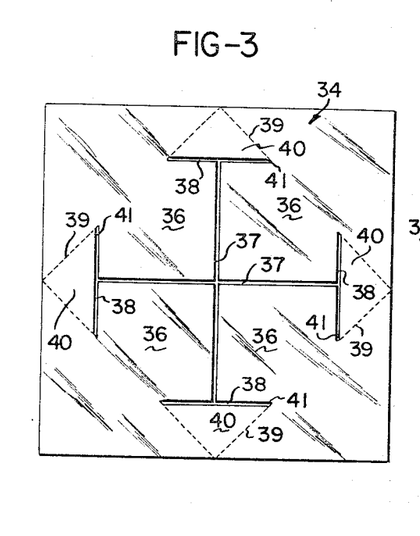
FIGURE 3 is a plan view of a separator cell blank.
Figure 4:
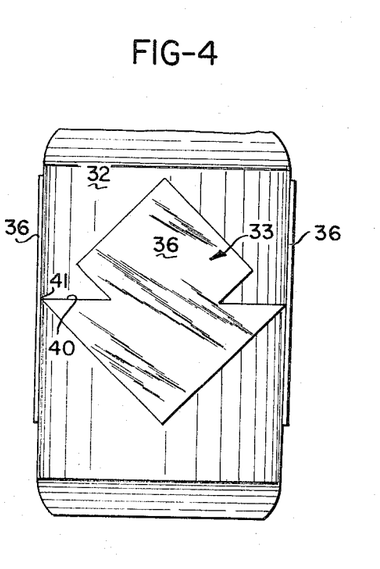
FIGURE 4 is a fragmentary, side view of the separator cell of FIGURE 3 being disposed around an object.
Figure 5:
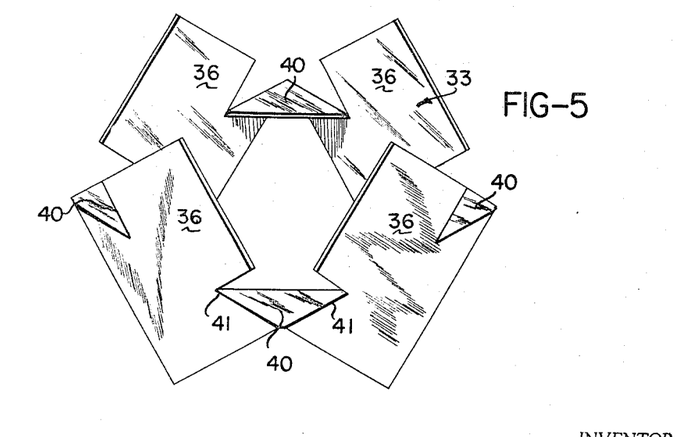
FIGURE 5 is a perspective view of the separator cell in its erected annulus condition.

In particular, reference is made to FIGURES 3–5 wherein a substantially flat and square separator cell blank is generally indicated by the reference numeral 34 in FIGURE 3 and the erected separator annulus cell is generally indicated by the reference numeral 33 in FIGURE 5.

The separator cell blank 34 is divided into four like panels 36 adapted to be respectively moved out of the same plane and disposed in planes at right angles to the planes of adjacent side panels 36 in the manner illustrated in FIGURE 5, whereby the panels 36 are adapted to tangentially engage the cylindrical side wall of the object 32 in the manner illustrated in FIGURE 4.

The panels 36 are defined by a cross-shaped slit network 37 formed in the center of the blank 34 and having short legs 38 disposed transversely to the legs of the cross 37 at points spaced inboard from the free edges of the blank 34.

The blank 34 is scored at 39 to define triangular sections 40 between the slits 38 and the free edges of the blank 34, whereby when the blank 34 is erected into the annulus configuration illustrated in FIGURE 5, the sections 40 are disposed perpendicular to the planes of the panels 36 and are adapted to have their inner edges tangentially engage the cylindrical side walls of the encompassed object 38. Thus, the erected panels 36 are joined to each other at the tips 41 of the sections 40 and are rigidified by the sections 40 disposed therebetween.

Thus, it can be seen from FIGURE 5 that when the blank 34 is erected into the annulus cell 33 an opening passes centrally through the erected cell 33 and is adapted to telescopically receive the object 32 in the manner illustrated in FIGURES 1 and 4.

The method and apparatus of this invention for placing such separator cells 33 around the objects 32 will now be described and reference is made to FIGURE 6 wherein the method and apparatus of this invention is generally indicated by the reference numeral 42.

Figure 6:
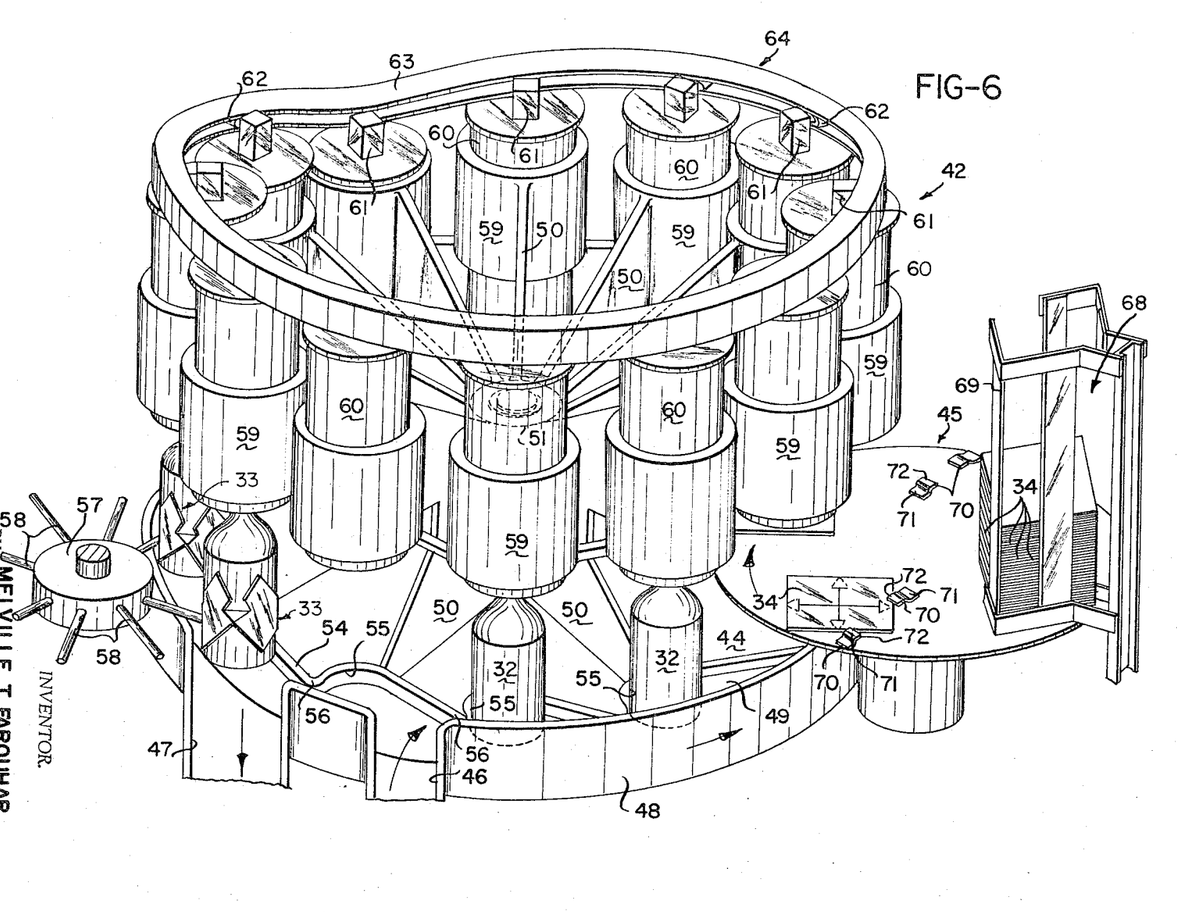
FIGURE 6 is a schematic, perspective view illustrating the apparatus of this invention.
Figures 9, 10:
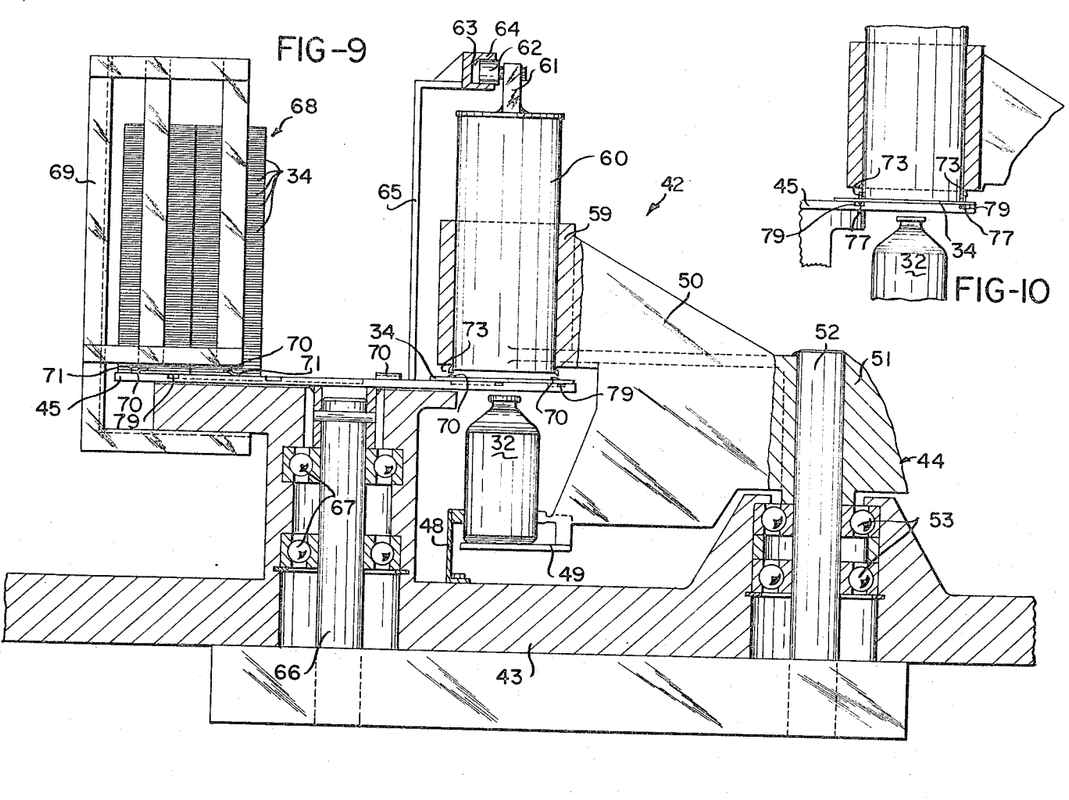
FIGURE 9 is a partial cross-sectional view taken on line 9—9 of FIGURE 7.
FIGURE 10 is a fragmentary, cross-sectional view taken on line 10—10 of FIGURE 7.

As illustrated in FIGURES 6 and 9, the apparatus 42 comprises a suitable support means 43 carrying a pair of rotatable tables 44 and 45 in a manner hereinafter described, the support means 43 including an inlet guide means 46 and an outlet guide means 47 for routing the objects 32 through the apparatus 42.

Figures 7, 11:
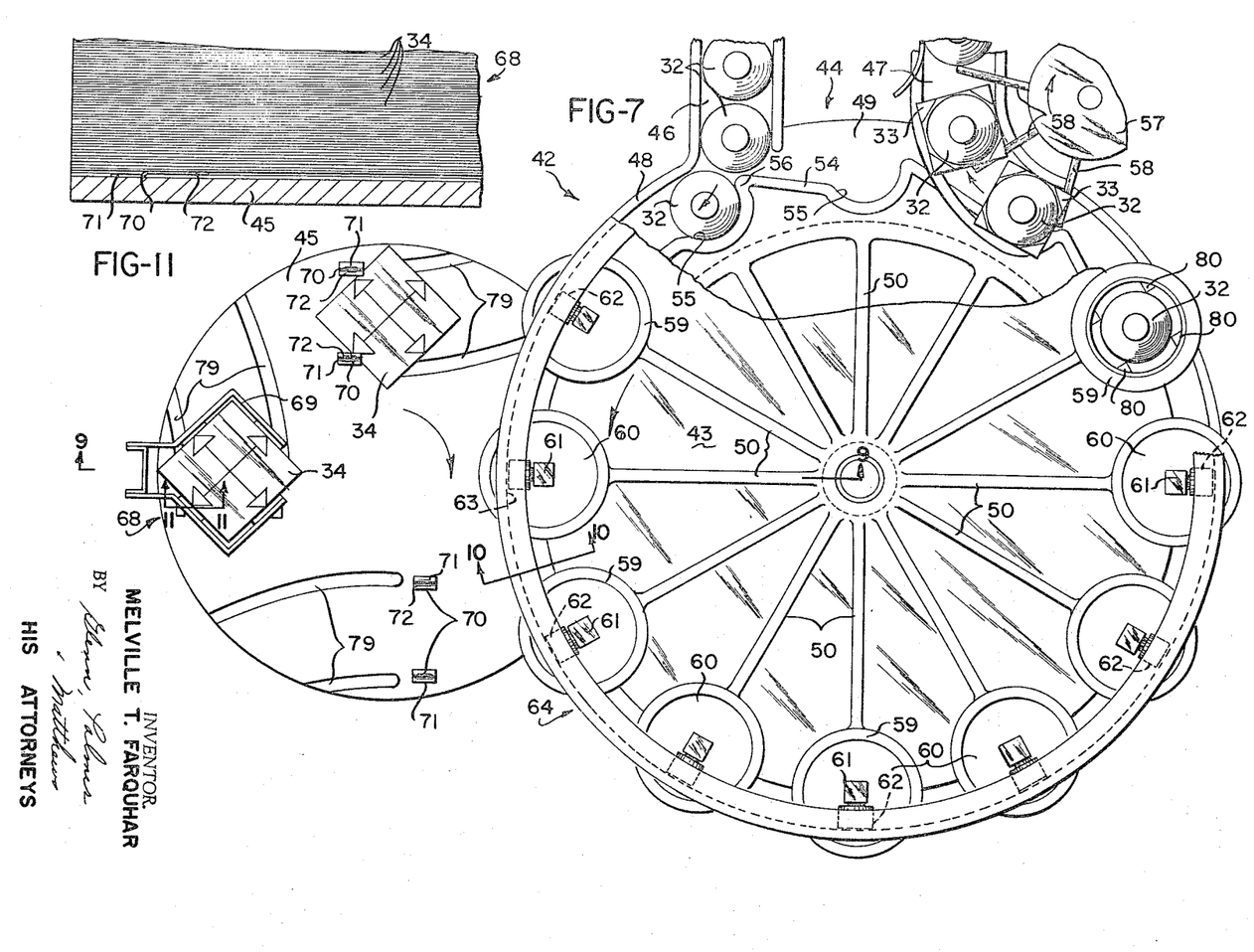
FIGURE 7 is a broken away, top view of the apparatus illustrated in FIGURE 6.
FIGURE 11 is an enlarged, fragmentary, cross-sectional view taken on line 11—11 of FIGURE 7.

As illustrated in FIGURE 7, the support means 43 includes an outer guide wall 48 substantially defining a perimeter of a circle from the inlet guide means 46 to the outlet guide means 47 thereof.

The table 44 includes a ring-like platform 49 suspended above the support means 43 in the manner illustrated in FIGURE 9 by a plurality of radially disposed braces 50 joined at their outer ends to the platform 49 and at their inner ends thereof to a hub 51 fixedly secured to a rotatable shaft 52, the shaft 52 being journaled in the support means 43 by suitable bearings 53 and being rotatably driven in any suitable manner.

In this manner the table 44 is adapted to be rotated relative to the support means 43 while the platform 49 thereof cooperates with the guide rail 48 to hold the objects 32 in the proper position during their movement about the support means 43 in a manner hereinafter described.

As illustrated in FIGURES 6 and 7, a guide channel 54 is carried by the platform 49 and is so constructed and arranged to define a plurality of arcuate compartments 55 which cooperate with the stationary guide rail 48 to cause sequential feeding of the objects 32 onto the platform 49.

In particular, the objects 32 are continuously fed down the inlet guide channel 46 by any suitable means, such as a continuously moving belt on which the objects 32 are placed so that the belt can continue to move even though the objects 32 are held stationarily thereon for various intervals.

As the table 44 rotates, the objects 32 are continuously moved toward the platform 49 at the inlet guide shaft 46 in the manner illustrated in FIGURE 7. However, the leading portions 56 of the guide channel 54 prevent the objects 32 from being pushed onto the platform 49 until an arcuate portion 55 thereof is aligned with the guide channel 46. When an arcuate channel 55 of the guide rail 54 is aligned with the inlet guide channel 46, an object 32 is pushed into such arcuate portion 55 whereby the same is moved by the platform 49 in an arcuate path through the apparatus 42.

As the objects 32 pass from the inlet guide means 46 through the apparatus 42 to the outlet guide means 47 thereof, separator cells 33 are respectively disposed around the same in a manner hereinafter described, the apparatus 42 being adapted to place a separator cell 33 around each object 32 or alternate ones or any desired sequence of objects 32 passing therethrough, as will be apparent hereinafter.

As the objects 32 are advanced through the apparatus 42 by the moving platform 49, the arcuate portions 55 of the guide rails 54 subsequently become aligned with the outlet guide means 47 in the manner illustrated in FIGURES 6 and 7, whereby the objects 32 are pushed into the outlet guide means 47 by a rotating member 57 having a plurality of radially disposed push rods 58 extending therefrom and which are adapted to serially remove the objects 32 from the apparatus 42 and push the same into the outlet guide means 47 upon rotation of the element 57 in timed relation with rotation of the table 44 in any suitable manner.

After the objects 32 have entered the outlet guide channel 47 in the above manner, the same are conveyed away from the apparatus 42 in any suitable manner, such as by a continuously moving belt or the like, whereby the objects 32 are adapted to be delivered to a packaging apparatus of this invention as hereinafter described.

The movable table 44 of the apparatus 42 has one brace 50 for each arcuate portion 55 of the guide means 54 thereof, as illustrated in FIGURE 7, and each brace 50 carries a vertically disposed cylinder 59, as illustrated in FIGURES 6 and 9, which is disposed directly above the object 32 being carried by that particular arcuate portion 55.

Each cylinder 59 of the apparatus 42 telescopically carries a hollow member 60 which is adapted to reciprocate relative to the cylinder 59.

In particular, each hollow member 60 is adapted to be raised and lowered relative to the object 32 disposed below the same in order to place a separator cell 33 around the particular object 32 in a manner hereinafter described.

Each hollow member 60 has a support 61 extending upwardly therefrom and carrying a roller 62 which is adapted to be received in a channel 63 of a cam track 64 carried by the support means 43 by suitable braces 65, FIGURE 9, so that as the table 44 rotates and moves the hollow members 60 throughout an arcuate path, the cam track 64 causes the hollow members 60 to raise and lower in a predetermined pattern to accomplish the function of placing the separator cells 33 around the objects 32 being conveyed through the apparatus 42 by the rotatable table 44.

As illustrated in FIGURES 6 and 9, the other rotatable table 45 is carried on a shaft 66 journaled in the support means 43 by suitable bearings 67, whereby the table 45 is adapted to be rotated relative to the support means 43 by any suitable drive means.

For example, the means driving the shaft 52 of the rotatable table 44 can also drive the shaft 66 of the rotatable table 45 through a suitable gear train so that the tables 44 and 45 will be rotated in unison in a desired time relation relative to each other to accomplish the functions of the apparatus 42 hereinafter described.

A stack 68 of separator cell blanks 34 are disposed in a hopper 69 carried by the support means 43 in the manner illustrated in FIGURE 9, whereby the stack 68 of separator cell blanks 34 rest on the rotatable table 45 and are prevented from moving in unison therewith by the hopper 69.

Therefore, it can be seen that the table 45 spans the space between the stack 68 of separator cell blanks 34 and the platform 49 of the rotatable table 44 in the manner illustrated in FIGURE 9 and is utilized to sequentially deliver separator cell blanks 34 from the stack 68 to a position over each object 32 as the objects 32 are passing through the apparatus 42 in the manner previously described.

In particular, the table 45 has a plurality of pairs of pick-up fingers 70 arranged thereon, each finger 70 having a trailing portion 71 thereof secured directly to the table 45 and a stepped free end 72 thereof raised above the surface of the table 45 a distance sufficient to permit one separator cell blank 34 to be disposed therebeneath.

While any number of pairs of fingers 70 can be disposed on a rotatable table 45, four such pairs are provided in the embodiment of the apparatus 42 illustrated in the drawing.

Therefore, it can be seen that as the table 45 rotates relative to the stack 68 of separator cell blanks 34, each pair of fingers 70 comes adjacent the stack 68 and has the free ends 72 thereof slipped between the lowermost separator cell blank 34 and the remainder of the stack 68 so that continuous movement of the table 45 carries the lowermost separator cell blank 34 therewith in an arcuate path from the stack 68 to a position over an object 32 being advanced through the apparatus 42 by the table 44.

As each separator cell blank 34 is advanced by the table 45 over the object 32, the respective hollow member 60 of the apparatus 42 removes the separator cell blank 34 from the table 45 and moves the blank 34 in unison with the object 32 around the arcuate path of the table 49, the hollow member 60 causing the blank 34 to be telescoped over the object 32 and be converted into the separator annulus cell 33 in a manner hereinafter described.

In particular, the cam track 64 is so constructed and arranged that the same causes the particular hollow member 60 as it is positioned over the separator cell blank 34 being disposed above the particular object 32 by the table 45 to move slightly downwardly and cause knife-like members 73 of the hollow member 60 to pierce into the separator cell blank 34 so as to cause the same to move in unison with the particular hollow member 60.

Figure 12:
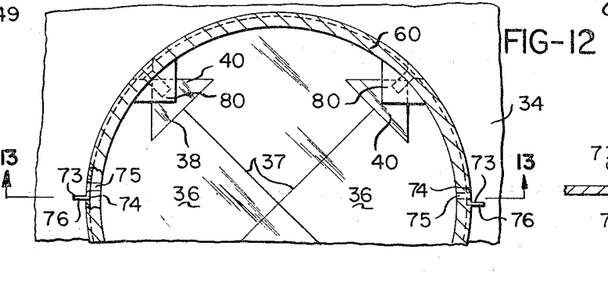
FIGURE 12 is an enlarged, fragmentary, cross-sectional view taken on line 12—12 of FIGURE 8.
Figure 13:
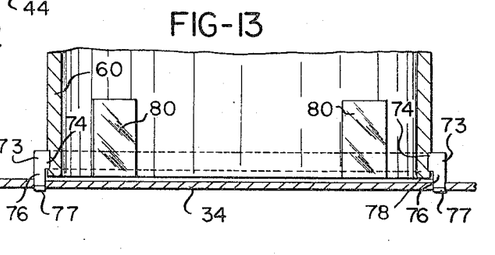
FIGURE 13 is a fragmentary, cross-sectional view taken on line 13—13 of FIGURE 12.

As illustrated in FIGURES 12 and 13, each knife-like member 73 is substantially L-shaped and has one leg 74 thereof secured to the outer periphery of the hollow member 60 by a rivet 75 or the like, while the other leg 76 thereof projects radially outwardly from the particular hollow member 60, as illustrated in FIGURE 12, the leg 76 also projecting downwardly in the manner illustrated in FIGURE 13 and having its knife-like end 77 disposed below the end 78 of the hollow member 60 so as to permit the same to pierce into the separator cell blank 34.

As illustrated in FIGURE 7, a pair of arcuate channels 79 are respectively formed in the top surface of the table 45 and respectively cooperate with the fingers 70 to define clearance means for permitting the knife-like members 73 of the hollow members 60 to pierce completely through the separator cell blanks 34 and move relative to the table 45 without interference from the table 45.

In particular, it can be seen that as the hollow member 60 moves from the position illustrated in FIGURE 9 to the position illustrated in FIGURE 10, the knife-like members 73 of the particular hollow member 60 are moved vertically downwardly by the cam track 64 to cause the knife-like members 73 to pierce through the particular separator cell blank 34 and have the free ends 77 of the knife-like members 73 received in the channels 79 of the table 45 so that further rotation of the hollow members 60 and the table 45 permit the knife-like members 73 to carry the particular separator cell blank 34 off the table 45 in a path corresponding to movement of the object 32 disposed directly below the particular separator cell blank 34.

Figure 8:
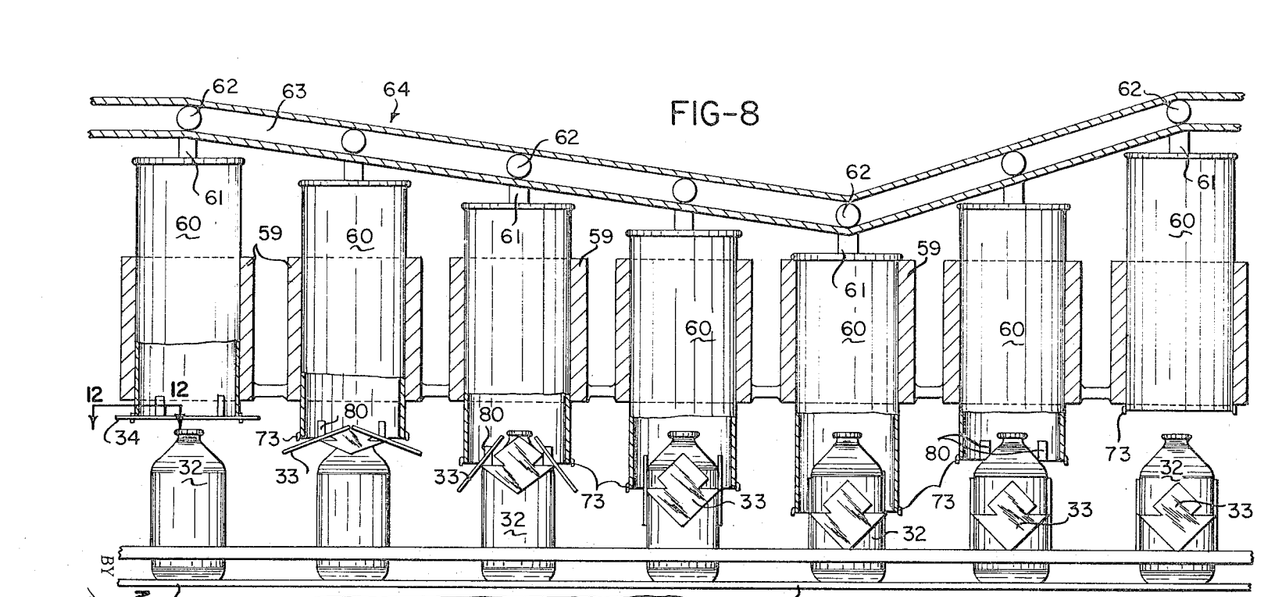
FIGURE 8 is a schematic side view illustrating certain operating parts of the apparatus of this invention.

As each separator cell blank 34 is moved in unison with the particular object 32 by the hollow member 60 in the manner previously described, the cam track 64 is so constructed and arranged that the same is adapted to start downward movement of the hollow member 60 to cause the same to telescope the object 32 to the desired extent, as illustrated systematically in FIGURE 8.

As illustrated in FIGURE 8, it can be seen that as each hollow member 60 is moved downwardly to telescope with the object 32, the hollow member 60 causes the particular separator cell blank 34 carried thereby to be converted from its flat form into its annulus form about the object 32, whereby the separator cell 33 has been completely disposed around the object 32.

After the separator cell 33 has been disposed around the object 32 to the desired position thereon, the cam track 64 then causes upward movement of the hollow member 60 in the manner illustrated in the right-hand portion of FIGURE 8 so that the object 32 and its encompassing separator cell 33 can be advanced by the table 44 to the outward guide means 47 and be dispensed from the apparatus 42 in the manner previously described.

In order to convert the flat separator cell blank 34 into its separator annulus form in the manner illustrated in FIGURE 8, each hollow member 60 has a plurality of trangular abutment 80 disposed inside the same and at the lower end thereof, each abutment 80 being adapted to be positioned over a triangular section 40 of the separator cell blank 34 so that when the separator cell blank 34 is lowered relative to the object 32 the top of the object 32 pushes upwardly at the center of the cross slit 37 thereof to cause the side panels 36 thereof to begin to fold on the score lines 39 and form the annulus structure illustrated in FIGURE 5, while the platforms or sections 40 thereof are being pushed vertically downwardly by the triangular elements 80 of the hollow member 60.

Therefore, it can be seen that by lowering the hollow member 60 relative to the object 32 the same cooperates with the object 32 to convert the separator cell blank 34 into the annulus form 33 around the object 32.

While the telescoped separator annulus cell 33 is illustrated in the drawings as only being disposed medially on the object 32, it is to be understood that the position of the cell 33 relative to the object 32 can be varied by varying the amount of telescoping movement of the hollow member 60 relative to the object 32.

Therefore, it can be seen that the method and apparatus of this invention previously described operates in such a manner that separator cell blanks 34 are adapted to be sequentially taken from a stack 68 thereof and disposed in a position over an object 32 being carried by the table 44, whereby the respective hollow member 60 removes the separator cell blank 34 from the table 45 and causes the same to move at the same speed as the object 32, while the hollow member 60 is progressively lowered relative to the object 32 to convert the separator cell blank 34 into the annulus cell 33 around the object 32. Thereafter, the hollow member 60 is raised relative to the object 32 so that the object 32 can be removed from the apparatus 42 by the element 57 in the manner previously described.

While the apparatus 42 has been previously described as operating in a manner to place a separator annulus cell 33 around each object 32 as the objects 32 are passed through the apparatus 42, it is to be understood that the apparatus 42 can be so constructed and arranged that the same places a separator annulus cell 33 around every other object 32 that passes through the apparatus 42. For example, the table 45 can be so constructed and arranged that the same only positions a separator cell blank 34 over every other object 32 as it passes through the apparatus 42.

As the objects 32 leave the apparatus 42 by means of the outlet guide means 47, the same can be conveyed by a conveyor belt or the like to the packaging apparatus of this invention illustrated in FIGURES 14–22.

In particular, the embodiment of the packaging apparatus of this invention is generally indicated by the reference numeral 81 in FIGURES 14–22 and the apparatus 42 cooperating therewith is so constructed and arranged that every other object 32 has a separator annulus cell 33 disposed around the same.

Alternately, the cooperating apparatus 42 could place a separator annulus cell 33 around every object 32 passing therethrough, and, either by manual or automatic means, objects 32 without separator cells 33 could be placed in the outlet guide means 47 so that every other object 32 being advanced by the guide means 47 to the apparatus 81 of this invention does not have a separator cell 33 disposed around the same.

In any event, the apparatus 81 will operate in substantially the same manner regardless of whether all the objects 32 being advanced thereto have separator cells 33 disposed around the same or alternatively, as illustrated.

Figures 14, 15, 17, 18:
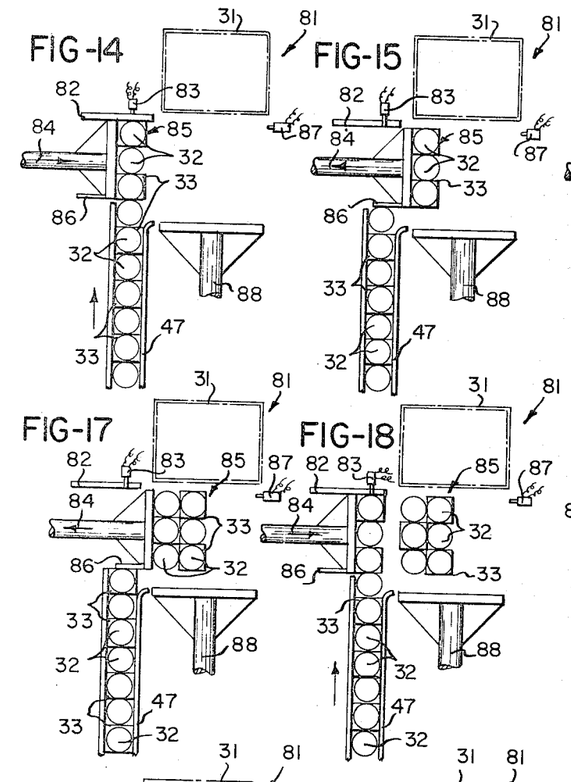

As illustrated in FIGURE 14, the objects 32 are advanced through the guide means 47 by any suitable conveying means, such as a continuously running belt on which the objects 32 are placed. As the objects 32 are advanced through the guide means 47, the same are eventually moved against a stop member 82 whereby further advancement of the objects 32 by the conveying means is terminated. As the leading object 32 is advanced against the stop member 82, the same trips a suitable switch 83 which causes a ram member 84 to move longitudinally in the manner illustrated in FIGURES 14 and 15 to move a row 85 of the objects 32 from out of alignment with the guide means 47 to the position illustrated in FIGURES 15 and 16, the ram member 84 having a stop 86 which prevents the objects 32 from being advanced through the guide means 47 while the ram member 84 is positioning the row 85 in the position illustrated in FIGURE 15.

Figures 16, 19:
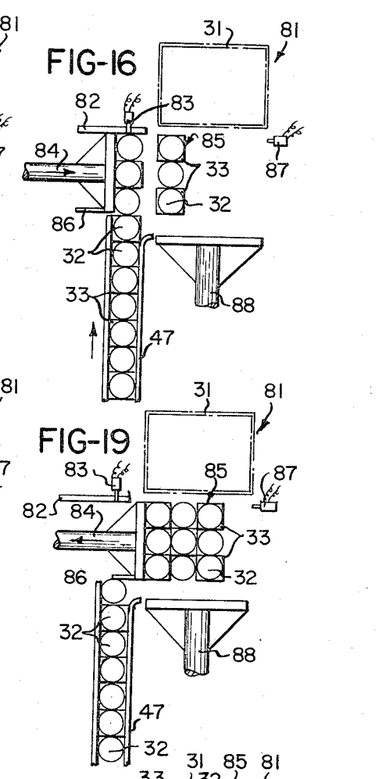

Thereafter, the ram member 84 is moved back to the left in the manner illustrated in FIGURE 16, whereby another row of objects 32 are adapted to be advanced through the guide means 47 to a position against the stop member 82 whereby the switch 83 is again energized to cause the ram member 84 to move the new row of objects 32 at the stop member 82 to right in the manner illustrated in FIGURE 17.

Figure 20:
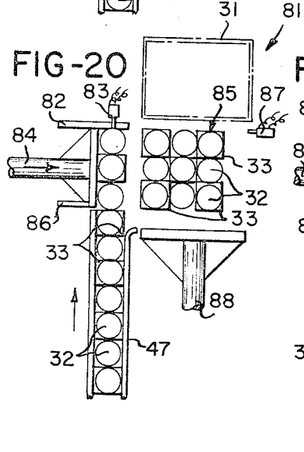
Figure 21:
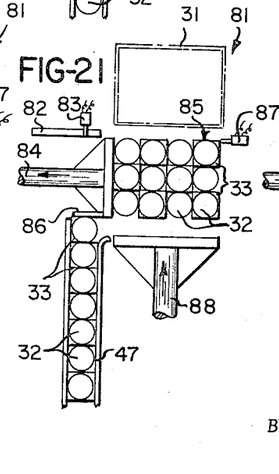
Figure 22:
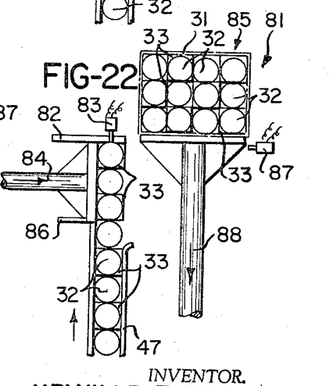

The ram member 84 continues to move each succeeding row of objects 32 in the manner illustrated in FIGURES 19 and 20 until a desired number of rows of objects 32 have been moved out of alignment with the guide means 47 in the manner illustrated in FIGURE 21, whereby the first row 85 thereof trips a switch 87 which terminates operation of the ram member 84 and causes a second ram member 88 to move in the direction indicated by the arrows in FIGURES 21 and 22 to move the rows 85 of objects 32 into the carton structure 31, as illustrated in FIGURE 22, whereby the filled carton structure 31 can be removed from the apparatus 81 either manually or automatically and be subsequently closed while another empty carton 31 is being replaced in the proper position.

Therefore, it can be seen that the apparatus 81 is adapted to take the objects 32 from the apparatus 42 and package the same in the carton 31 in a strictly automatic manner so that the number of manual steps required in placing the separator cells around the objects 32 in the desired pattern for packaging thereof is held to a minimum.

Therefore, it can be seen that this invention provides an improved method and appartus for placing separator cells around fragile objects or the like in a true automatic manner and also provides means for packaging such objects in a carton structure or the like without requiring manual steps or the like.

While the form of the invention now preferred has been disclosed as required by the statutes, other forms may be used, all coming within the scope of the claims which follow.

What is claimed is:

1. Apparatus for placing a separator cell around an object comprising a continuously moving conveyor means for continuously moving said object, means providing a stack of substantially flat separator cell blanks, means for taking one of said blanks from said stack and positioning said one blank over said object, and a hollow member for taking said positioned blank and moving said one blank at the same speed as said object while telescoping with said object to cause said one blank to engage and telescope with said object to convert said one blank into a separator annulus cell around said subject while said object is continuously moving.

2. Apparatus as set forth in claim 1 wherein said hollow member is operatively interconnected to a cam track that lowers and raises said said member relative to said object.

3. Apparatus as set forth in claim 1 wherein said hollow member moves in unison with said conveyor means.

4. Apparatus as set forth in claim 1 wherein said hollow member and said conveyor means are operatively interconnected together to move in unison.

5. Apparatus for placing a separator cell around an object comprising a continuously moving conveyor means for continuously moving said object, means providing a stack of substantially flat separator cell blanks, a rotatable table spanning the space between said stack and said conveyor means, said table having means for removing one blank from said stack and positioning said one blank over said objects, and a hollow member for taking said positioned blank from said table and moving said one blank at the same speed as said object while telescoping with said object to cause said one blank to engage and telescope with said object to convert said one blank into a separator annulus cell around said object while said object is continuously moving.

6. Apparatus for placing a separator cell around an object comprising a first rotatable table for continuously moving said object in an arcuate path, means providing a stack of substantially flat separator cell blanks, a second rotatable table spanning the space between said stack and said first table, said second table having means for removing one blank from said stack and positioning said one blank over said object, and a hollow member for taking said positioned blank from said table and moving said one blank at the same speed as said object while telescoping with said object to cause said one blank to engage and telescope with said object to convert said one blank into a separator annulus cell around said object while said object is continuously moving.

7. Apparatus as set forth in claim 6 wherein said hollow member is telescopically carried by an element, said element being carried by said first table.

8. Apparatus as set forth in claim 6 wherein said hollow member is operatively interconnected to a cam track for causing raising and lowering movement of said hollow member.

9. Apparatus as set forth in claim 6 wherein said first table has a plurality of object carrying stations and a plurality of hollow members are respectively provided for said stations.

10. Apparatus as set forth in claim 6 wherein said first table carries a plurality of said hollow members.

11. Apparatus for placing a separator cell around an object comprising a continuously moving conveyor means for continuously moving said object, means providing a stack of substantially flat separator cell blanks, a rotatable table spanning the space between said stack and said conveyor means, said table having means for removing one blank from said stack and positioning said one blank over said object, and a hollow member for taking said positioned blank from said table and moving said one blank at the same speed as said object while telescoping with said object to cause said one blank to engage and telescope with said object to convert said one blank into a separator annulus cell around said object while said object is continuously moving, said hollow member having knife means for piercing said one blank on said table so that said hollow member can carry said one blank away from said table.

12. Apparatus as set forth in claim 11 wherein said table has groove means formed therein to cooperate with said knife means.

13. Apparatus for placing a separator cell around an object comprising means for taking a substantially flat single thickness separator cell blank and converting said blank into an annulus around said object by forcing said blank against said object thereby causing said blank and object to telescope whereby said blank converts to an annulus around said object.

14. Apparatus for placing a separator cell around an object comprising means for continuously moving said object, and means for taking a flat single thickness separator cell blank and converting said blank to an annulus around said object while said object is continuously moving by forcing said blank against said object thereby causing said blank and object to telescope whereby said blank converts to an annulus around said object.

15. Apparatus for placing a separator cell around an object comprising means for continuously moving said object, means for providing a stack of single thickness separator cell blanks, means for taking one blank from said stack, and means for converting said one blank to a separator annulus cell around said object while said object is continuously moving by forcing said blank against said object thereby causing said blank and object to telescope whereby said blank converts to an annulus around said object.

References Cited
UNITED STATES PATENTS

| | | | |
|---|---|---|---|
| 1,962,481 | 6/1934 | Clark | 53—292 X |
| 2,825,193 | 3/1958 | Loveridge | 531—163 |
| 2,941,339 | 6/1960 | Salwasser | 53—247 X |

TRAVIS S. McGEHEE, *Primary Examiner.*

FRANK E. BAILEY, *Examiner.*

A. E. FOURNIER, R. L. FARRIS, *Assistant Examiners.*